United States Patent
Karlov et al.

(10) Patent No.: US 6,304,878 B1
(45) Date of Patent: Oct. 16, 2001

(54) METHOD AND SYSTEM FOR IMPROVED ENUMERATION OF TRIES

(75) Inventors: Donald D. Karlov, Woodinville; Gregory N. Hullender, Kirkland; John R. Bennett, Redmond, all of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/199,949

(22) Filed: Nov. 23, 1998

(51) Int. Cl.$^7$ .............................. G06F 17/00; G06F 17/21
(52) U.S. Cl. .................. 707/102; 707/3; 704/10
(58) Field of Search ................. 707/1, 3, 4, 6, 707/7, 100, 101, 102, 103, 104; 704/1, 8, 9, 10

(56) References Cited

U.S. PATENT DOCUMENTS

| | | | |
|---|---|---|---|
| 4,730,348 | 3/1988 | MacCrisken | 375/240 |
| 4,814,746 | 3/1989 | Miller et al. | 341/95 |
| 4,853,696 | 8/1989 | Mukherjee | 341/65 |
| 4,959,785 | 9/1990 | Yamamoto et al. | 707/533 |
| 5,283,894 | 2/1994 | Deran . | |
| 5,475,588 * | 12/1995 | Schabes et al. | 704/9 |
| 5,488,717 * | 1/1996 | Gibson et al. | 395/600 |
| 5,488,719 * | 1/1996 | Kaplan et al. | 395/600 |
| 5,532,694 | 7/1996 | Mayers et al. | 341/67 |
| 5,592,667 | 1/1997 | Bugajski | 707/102 |
| 5,625,554 | 4/1997 | Cutting et al. | 707/100 |
| 5,651,099 * | 7/1997 | Konsella | 395/13 |
| 5,721,899 * | 2/1998 | Namba | 395/603 |
| 5,768,423 * | 6/1998 | Aref et al. | 382/228 |
| 5,778,371 | 7/1998 | Fujihara | 707/100 |
| 5,781,772 * | 7/1998 | Wilkinson, III et al. | 395/600 |
| 5,799,299 | 8/1998 | Fujiwara | 707/3 |
| 5,832,428 * | 11/1998 | Chow et al. | 704/254 |
| 5,951,623 | 9/1999 | Reynar et al. | 708/203 |
| 5,966,709 | 10/1999 | Zhang et al. | 707/101 |
| 6,009,392 * | 12/1999 | Kanevsky et al. | 704/245 |
| 6,131,102 * | 10/2000 | Potter | 707/533 |
| 6,182,039 * | 1/2001 | Rigazio et al. | 704/257 |
| 6,236,959 * | 5/2001 | Weise | 704/9 |

FOREIGN PATENT DOCUMENTS 41-0301596 A  11/1998  (JP) .............................. G10L/3/00

OTHER PUBLICATIONS

Knuth, Donald Ervin, "Sorting and Searching," *The Art of Computer Programming* $2^{nd}$ *Edition*, vol. 3, Addison–Wesley, pp. 492–496, 500–502, 507–509, 512, 576, 722 (1998).

* cited by examiner

Primary Examiner—Thomas Black
Assistant Examiner—Mary Wang
(74) Attorney, Agent, or Firm—Michalik & Wylie, PLLC (57) ABSTRACT

A method and system for enumerating a trie of states of nodes. A node near the middle of a state of alphabetically ordered nodes is selected as a skip node and moved to the logical beginning of the state. The skip node is provided with a pointer to a jump node that is at the skip node's former position, and the node immediately to the left of the node's former position is marked as a soft terminal node. As a result of the alphabetic ordering, the segment of nodes before the jump node are alphabetically before the skip node, while the segment of nodes after the jump node are alphabetically after the skip node. The segments of the state may be recursively split into further segments via further skip nodes, jump nodes and soft terminal nodes, and, once the segments are split as desired, the nodes within the segment may be sorted. When searching the state, if a skip node is reached that does not equal the search character, the search moves to the jump node if the search character is greater than the skip node, or to the next node if the search character is less than the skip node. The search of the nodes continues, essentially as a binary search when skip nodes are encountered, and a linear search otherwise, until a node is found that matches the search character or a soft or regular terminal node is reached.

36 Claims, 8 Drawing Sheets

METHOD AND SYSTEM FOR IMPROVED ENUMERATION OF TRIES

FIELD OF THE INVENTION

The invention relates generally to computer systems, and more particularly to an improved method and system for arranging lexical data for searching.

BACKGROUND OF THE INVENTION

A trie is a data structure that is useful for compressing lexical data such as dictionary words. Tries are composed of states, with a top-level state representing, for example, each of the first letters (e.g., a–z) of all valid words in a given dictionary. Each state is comprised of nodes, wherein each node represents a valid letter in that state, along with some information about that letter, such as a pointer to a lower state (if any). Each state represents a transition from one character in a word to the next. For example, the letter "q" in one state usually transitions to the letter "u" in a next lower state.

To use the trie, such as to find if a user-input word is a valid word in the dictionary, a search through the states is performed. For example, to find the word "the," the top level state in the trie is searched until the "t" node is found, and then a next lower level state pointed to by the "t" node is searched to determine if there is an "h" node therein. If not, the word "the" would not be a valid word in that dictionary. However, if there is an "h" node in the state pointed to by the "t" node, the "h" node is examined to find a next state, if any. The state pointed to by the "h" node is then searched to find out whether there is an "e" node therein. If there is an "e" node, to be a valid word, the "e" node needs to be followed by some indication (e.g., a flag) indicating that a valid word exists at this time, regardless of whether the "e" node points to a further state. In a trie-structured dictionary that properly represents the English language, "the" would be a valid word, and thus the top-level state would have a "t" node, the next state pointed to by the "t" node would have an "h" node therein, and the state pointed to by that "h" node would have an "e" node therein with a valid flag set. If characters such as "thj" were searched, however, the "t" node would transition to the next state which would have an "h" node therein, but the next state pointed to by "h" node would not include a "j" node, and thus this word would not be a valid word.

In Western scripts such as English, the top level state is generally from fifty to eighty nodes in length, while states other than the top level state are usually two to ten nodes in length. To search the top-level state, the nodes initially have been arranged alphabetically, and linearly searched from left to right. To speed the search, it is known to reorder the nodes in a states based on lexical frequency, i.e., in the top-level state, the "s" node comes before a "k" node since more words begin with the "s" character than the "k" character. This speeds the search because on the average, less nodes need to be visited before a match is found.

However, in Eastern scripts such as Chinese or Japanese, the top level state can be over ten-thousand nodes in length. Regardless of how ordered, the average linear search through so many nodes takes too long to be used in ordinary applications on ordinary computers. Nevertheless, many existing algorithms that operate on tries expect the states to be linear. If the nodes in a state are arranged in some other manner, the existing linear-based algorithms fail. In short, there has heretofore not been an adequate way in which to enumerate a trie for faster searching while preserving the characteristics of linear states for existing linear search algorithms.

SUMMARY OF THE INVENTION

Briefly, the present invention provides an improved trie enumeration method, system and data structure, along with a method of searching same that operates with binary-like search speeds on states of nodes arranged linearly. The enumeration method for a given state selects a node within that state as a selected node, and converts the selected node to a skip node by moving it forward in the state relative to its original position therein. A pointer is set in the skip node to point to a further node in the state (i.e., a jump node), and a skip flag is set to identify the selected node as a skip node. Ordinarily, the initial skip node is selected from the middle of an alphabetically ordered state, placed at the beginning of the state, and provided with a pointer to its previous position, i.e., the jump node. The node directly before the jump node is set to be a soft terminal node.

As a result of the alphabetic ordering, the segment of nodes before the jump node are alphabetically before the skip node, while the segment of nodes after the jump node are alphabetically after the skip node. The segments of the state may be recursively split into further segments via further skip nodes, jump nodes and soft terminal nodes in each segment. A threshold number of nodes per segment may be used to determine whether to further split a segment. Once the segments are split as desired, (e.g., such that no segment has a number of nodes that exceeds the threshold), the nodes within the segment may be sorted, such as by lexical frequency.

To search the skip encoded state, the search starts at the beginning of the state. If a skip node is encountered that does not equal the search character, the search skips to the jump node if the search character is greater than the skip node, or to the next node (linearly to the right) if the search character is less than the skip node. The search of the nodes continues, essentially as a binary search when skip nodes are encountered, and a linear search otherwise, until a node is found that matches the search character or a soft or regular terminal node is reached.

Other advantages will become apparent from the following detailed description when taken in conjunction with the drawings, in which:

DETAILED DESCRIPTION OF THE PREFERRED EMBODIMENT

Exemplary Operating Environment

Figure 1:
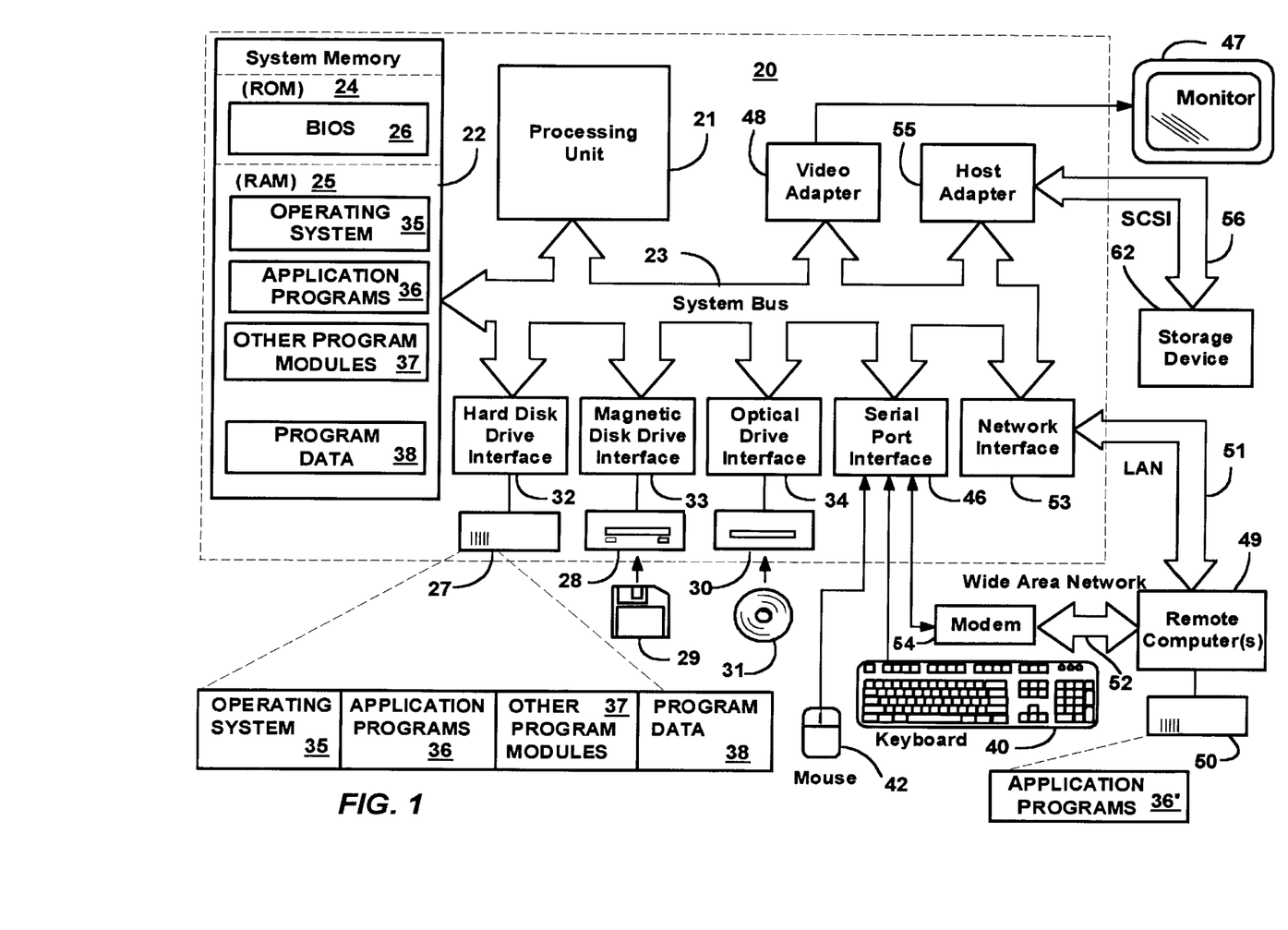
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

General Trie Enumeration

Figure 2:
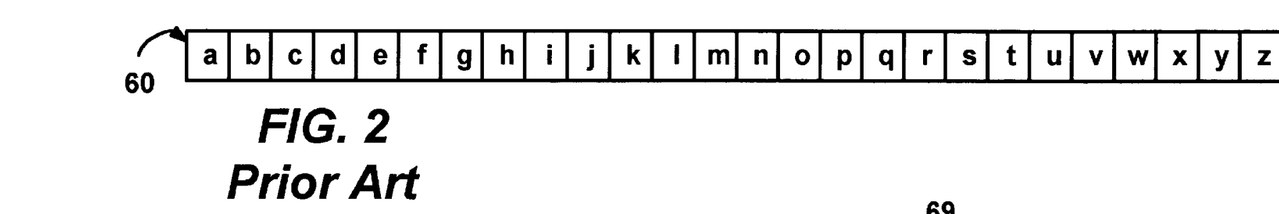
FIG. 2 is a representation of a top-level state having nodes therein enumerated alphabetically according to the prior art.

By way of background, FIG. 2 shows a top-level state 60 of a trie-structure according to the prior art, wherein the nodes in the state 60 are arranged for linear searching in alphabetic order. In general, a search of the nodes enumerated in this manner would proceed from left to right until either a node was found that matched the character in a word, or the last node was reached without achieving a match.

Figure 3:
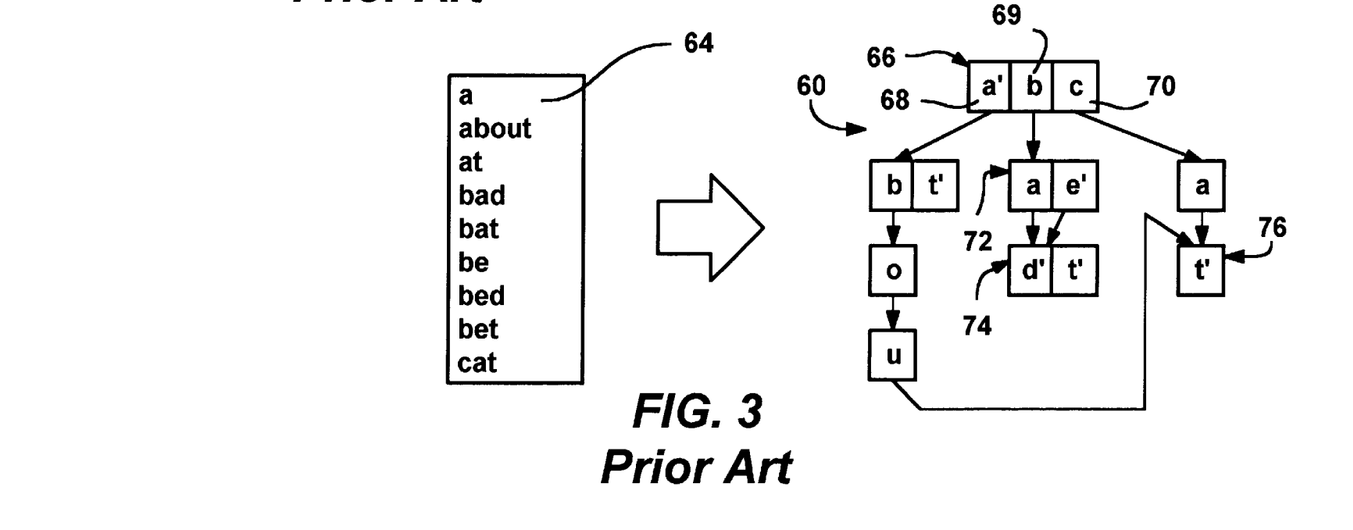
FIG. 3 is a representation of an alphabetically ordered trie-structured dictionary for a very small list of words according to the prior art.

FIG. 3 shows an alphabetically arranged trie-structured dictionary 62 according to the prior art that stores a small list 64 of nine words. In FIG. 3, the nodes are shown as boxes surrounding a character, while the states are shown as groups of one or more nodes, wherein if more than one node is in a state, the boxes representing the nodes of that state are shown in contact with one another. Transitions from a node to a next state are pointers, shown as arrows between nodes and lower-level states in FIG. 3. Also, in FIG. 3, nodes that end a valid word are indicated by an apostrophe (') representing a "valid" flag that is set to indicate when a valid word exists.

In FIG. 3, the top-level state 66 comprises nodes 68–70 representing characters that can start a word in this dictionary, "a," "b" and "c." Each of those nodes 68–70 transitions to other states representing further characters in words. For example, to find if the word "bet" is valid in the dictionary, the top-level state 66 is first searched to find if "b" is a valid start of a word. The "b" node transitions to another state 72 having an "a" node and an "e" node therein (wherein the apostrophe/flag after the "e" indicates that "be" is itself a valid word). A search of this next state 72 indicates that the "b" node is followed by an "e" node, so the word "bet" is still possibly valid. The "e" note transitions to another state 74 having a "d" node and a "t" node therein, and a search of this state 74 indicates that "bet" is a valid word. Note that a duplicated state need not be represented more than once, e.g., the state 76 having a single "t" node therein may be used to represent the last character in the valid dictionary word "about" as well as the last character in the valid dictionary word "cat."

Figure 4:
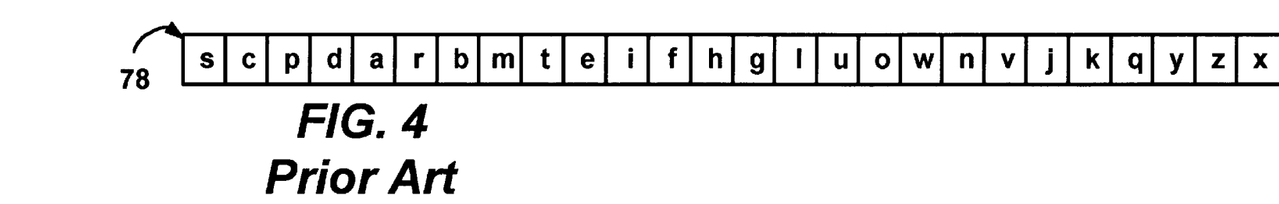
FIG. 4 is a representation of a top-level state having nodes therein enumerated by lexical frequency according to the prior art.

Lastly with respect to the state of the prior art, FIG. 4 shows a state 78 that is searched linearly but is organized by lexical frequency such that the more-common letters are searched before less-common letters. In other words, nodes with higher word counts in their subtrees are moved within a state in front of other nodes in that state with lesser word counts thereunder. As can be appreciated, this speeds up searches on the average, since over a random sample of words, statistically less nodes need to be visited before a matching node is found, if any.

Improved Trie Enumeration

Turning to FIGS. 5–10, in accordance with one aspect of the present invention, the nodes in a state are enumerated in an order and in such a way that enables a combination of binary and linear searching with speeds approaching binary search speeds. However, the linearity of the state is still preserved such that existing algorithms can perform linear searches on the state. To this end, the nodes of a state remain linear, with a small amount of information added to certain nodes of the state, as described below. The information essentially enables a search algorithm that is aware of the improved trie structure to rapidly search a state by a combination of binary and linear searching. Existing linear searching algorithms do not utilize the extra information, and thus proceed as before.

In tests, the present invention improved the speed of dictionary searches in the Japanese language by more than a factor of seventy, while adding less than one percent to the size of the trie structure. In tests run with English language words, the number of nodes visited (which determines the overall search speed) in test searches was less than half of the number of nodes visited using linear searches on states arranged in lexical frequency. While the benefits of the present invention are most apparent with the top-level state, which is typically the largest state in terms of the number of nodes, the present invention may provide benefits with lower level states, particularly lower-level states having relatively larger numbers of nodes.

Figure 5:
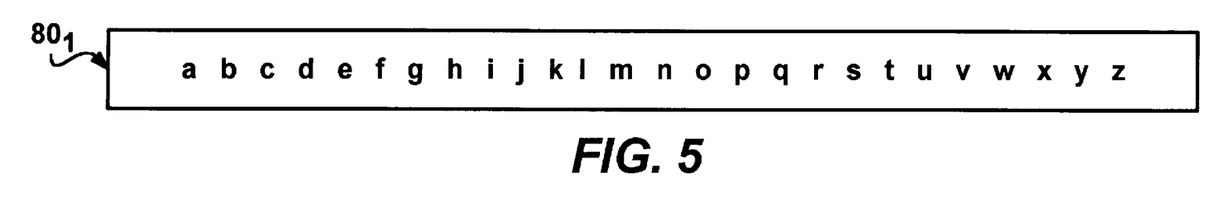
FIG. 5 is a representation of the nodes in a state prior to the improved enumeration thereof of the present invention.
Figure 6:
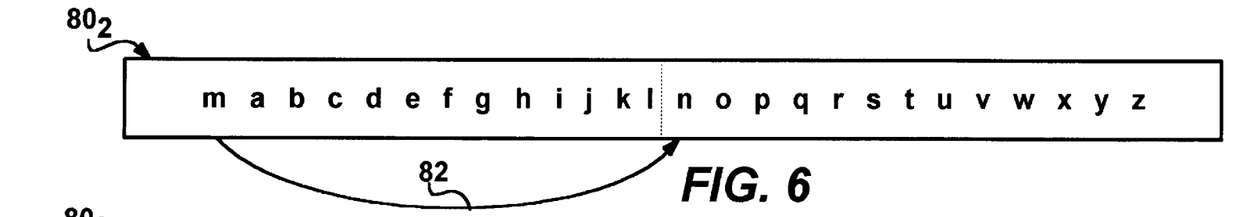
FIG. 6 is a representation of the nodes in the state of FIG. 5 having been enumerated for improved searching in accordance with one aspect of the present invention.

FIGS. 5–8 generally show the improved trie enumeration of the present invention using lowercase characters a–z of the English language. A state $80_1$, first has the nodes a–z therein in alphabetic order. Then, a node is selected at a location where it is desired to split the state $80_1$, and that node moved to the beginning of the state. For now, the state (now identified as $80_2$ in FIG. 6) will be split at the middle, however as described below, the state may be split in many other ways. Thus, as shown in FIG. 6, the "m" node is moved to the front of the state $80_2$, and a skip pointer 82 (FIG. 6 and FIG. 10) to the "n" node is placed in the "m" node. Also, a skip flag 93 (FIG. 10) is set in the "m" skip node so that this type of node may be recognized. Once moved in this manner, the "m" node is referred to herein as a "skip" node, while the "n" node is referred to as a "jump" node. Also, the "l" node is flagged as a "soft" terminal node, i.e., a soft terminal flag field 96 (FIG. 10) in the "l" node is set, as indicated by the dashed vertical line following the "l" node in FIG. 6.

In accordance with one aspect of the invention, if a skip node is detected during a search, and the search character does not match the skip node's character, then a comparison is made between the relative values of the search character and the skip node character to determine whether to skip to the jump node. If no skip is needed, (e.g., the search character is less than the skip character), then the simply advances linearly to the next node. If a skip is needed, then the search advances to the jump node, skipping over a number of nodes therebetween. However, because of the alphabetic ordering of the segments, it is known that no node that matches the search character will be skipped over. For example, if a word starts with a character alphabetically less than "m" then the search advances linearly to the next node in the first segment, "a" in FIG. 6, up to the "l" node. If a word starts with a character alphabetically greater than "m," then using the skip pointer, the search skips to the second segment, (e.g., beginning at the jump node "n" in FIG. 6), and progresses linearly from there as needed, possibly up to the "z" node. Of course, if the search character is an "m," the "m" node will be found right away. If a character that is less than the skip node but not in the state (e.g., "?") is the search character, then the soft terminal node (the "l" node in FIG. 6) will be reached and the character will not be in the state. If a character that is greater than the skip node but not in the state (e.g., "~") is the search character, then the terminal node (the "z" node in FIG. 6) will be reached and the character will not be in the state. At most, only fourteen nodes will need to be visited in the state $80_2$ of FIG. 6.

Thus, at this time, the skip encoded state $80_2$ of FIG. 6 is such that the average number of nodes that must be visited given a random distribution of search characters is essentially halved, plus one. Note that since prior art linear algorithms do not use the skip flag or the soft terminal flag, they operate as before, progressing from left to right without skipping over any nodes or stopping too soon.

Figure 7:
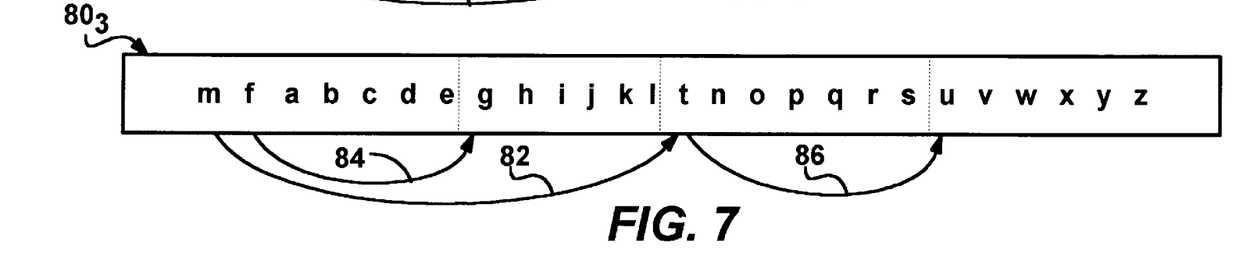
FIG. 7 is a representation of the nodes in the state of FIG. 6 having been further enumerated for improved searching in accordance with one aspect of the present invention.

While FIG. 6 shows the advantages of the present invention with only one split in the middle, FIG. 7 shows additional splits that ordinarily speed searching even more. In the state (now labeled $80_3$) of FIG. 7, each of the two segments of FIG. 6 (delineated by the soft terminal node and/or jump node) are themselves split into two segments, via skip new nodes "f" and "t." A threshold value may be used to recursively set such splits. For example, in FIG. 7, a threshold value of ten was chosen, such that any segment greater than length ten (excluding the skip node) is split recursively until each segment length is less than ten.

Thus, in FIG. 7, the "f" node is converted to a skip node with a skip pointer 84 pointing to the "g" node and moved to the start of the segment following the "m" skip node. Similarly, the "t" node becomes a skip node with a skip pointer 86 pointing to the "u" node, and is moved to the start of the segment skipped to by the "m" node. Note that jump nodes (and also soft terminal nodes) correspond to locations in the state, and do not follow moved nodes, whereby "t" becomes the new jump node of the "m" skip node, "g" becomes the jump node of the "f" skip node, and "u" becomes the jump node of the "t" skip node. The "e" node, "l" node and the "s" node are soft terminal nodes, indicated by the dashed vertical lines in FIG. 7. As shown in FIG. 7, four segments are now present.

Figure 8:
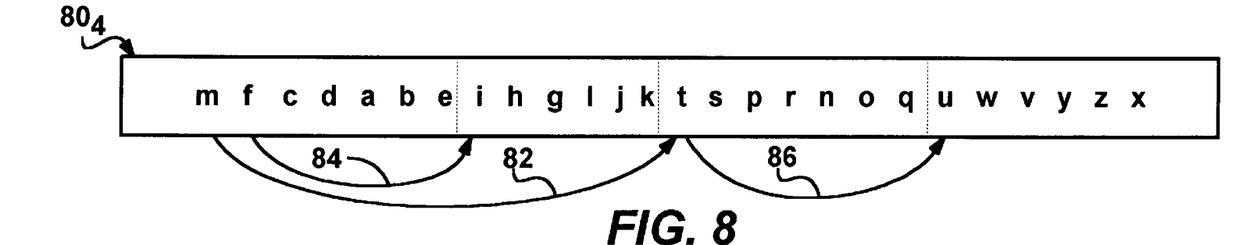
FIG. 8 is a representation of the nodes in the state of FIG. 7 having segments of nodes therein, with each segment having been sorted by lexical frequency in accordance with another aspect of the present invention.

Lastly, as shown in the state (now labeled $80_4$) of FIG. 8, once the segments are not to be further split, i.e., the number of nodes per segment do not exceed the threshold, the nodes within each segment that are not skip nodes may be reordered according to lexical frequency or the like. Note that no node is ever missed because after the skip nodes are searched, further searching continues as a linear search within a segment.

It should be noted that a trie structured in accordance with the present invention will be compatible with most forms of compression, such as Huffman byte encoding. However, the compression may need to be on a per-segment basis within a state so that the skip pointers properly point to the jump nodes following compression.

Figure 9:
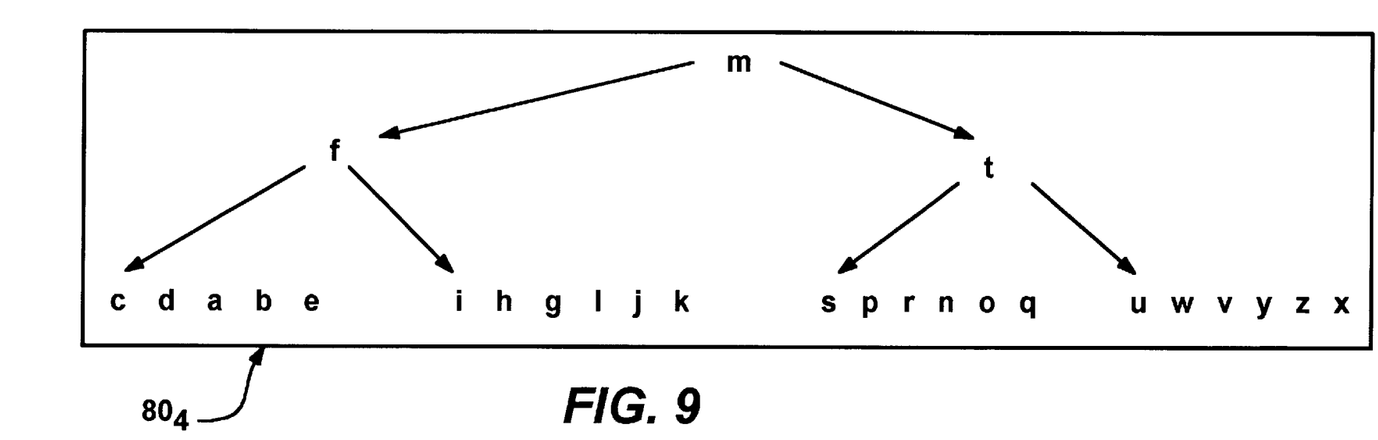
FIG. 9 is an alternative representation of the nodes in the state of FIG. 8.

FIG. 9 shows how the state looks from a binary search perspective after having been enumerated according to the present invention. Although in FIG. 9 the state $80_4$ shows arrows pointing to the left, it should be noted that in a preferred trie structure, there are no "left" pointers. Instead, by arranging the nodes linearly (as in FIG. 8) and moving the search linearly forward to the subsequent node when the comparison indicates the skip is not to the skip pointer, the need for any space-consuming skip-left pointers is eliminated.

Figure 10:
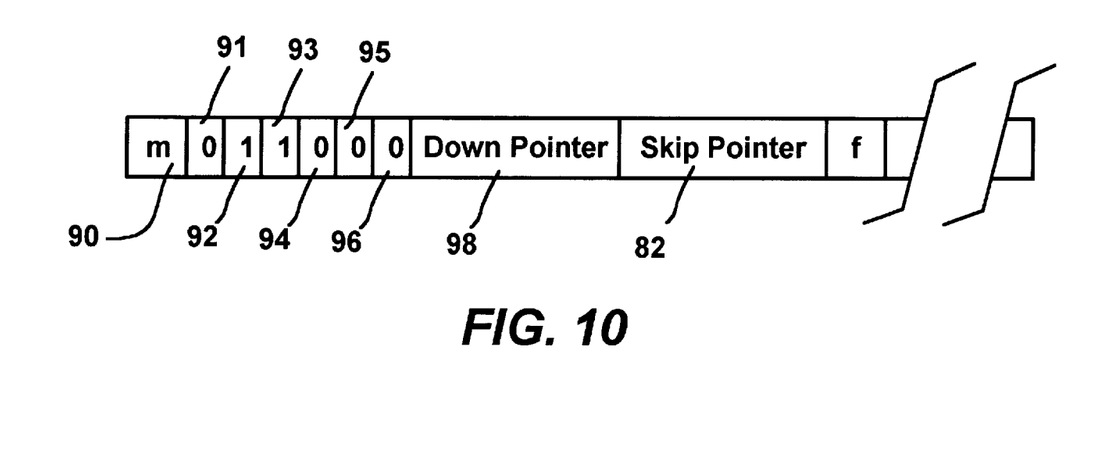
FIG. 10 is a representation of a node for the "m" character having information therein including a skip pointer in accordance with one aspect of the present invention.

FIG. 10 generally shows the structure of a skip node such as the "m" node, followed immediately thereafter in storage by the next node, i.e., the "f" node. In FIG. 10, a node identifier field 90 is followed by flags in fields 91–96. The flags 91–96 provide information on whether the node is the last character of a valid word (valid bit 91), whether the node has a down pointer (down bit 92) and whether the node is a skip node (skip bit 93). A right pointer bit 94 (not used for purposes of the present invention), a terminal (end) bit 95 indicating the end of a state and a soft terminal bit 96 indicating the end of a segment within a state are also provided. Additional flags may be used in a given scheme. The distinction between a regular terminal (end of state) and a soft terminal enables a straight linear searching to work, since a linear search will not be terminated upon reaching a soft terminal. A down pointer 98 points to a lower-level state below the "m" state, and, since "m" is a skip node, the skip pointer 82 (FIG. 6 and FIG. 10) is present therein.

Note that for purposes of keeping the trie as compact as possible, nodes preferably do not store pointers unless they need to. For example, a node that is not a skip node does not have a skip pointer, while a node that does not point down to a further state does not have a down pointer. Thus, the node is variable in size. However, when it is decompressed and read, which pointers are in the node are known from the node's flag values, and although the pointers are variable in size, their encoded data includes their size information. After a node is decompressed, is size is known, and thus the location of the subsequent node is known to begin at the next byte thereafter without the need for a right pointer.

Figure 11:
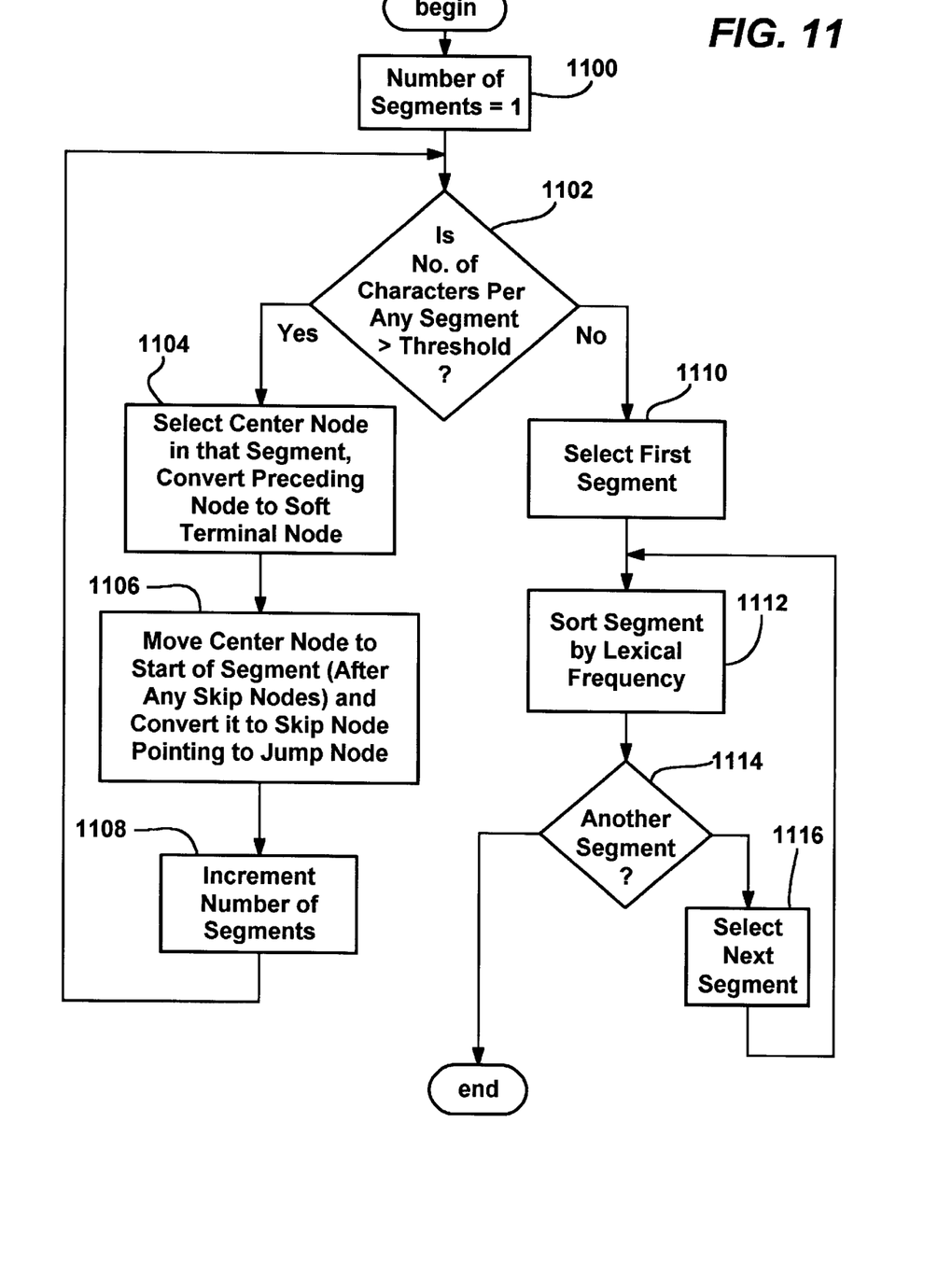
FIG. 11 is a flow diagram generally representing the steps taken to enumerate the nodes in a state for improved searching thereof in accordance with one aspect of the present invention.

Turning to an explanation of the operation of the invention with respect to the flow diagram of FIG. 11, FIG. 11 shows the general steps taken to enumerate a state in accordance with the present invention, such as the above-described state shown in FIGS. 5 to 8. For purposes of the present example, a threshold value representing the maximum segment length is set to ten. As will be understood, it is straightforward to vary this threshold value and empirically test for which value gives the best results. In any event, first, at step 1100, a segment counter or the like is set to one. Although not necessary to the present invention, the segment counter may be used to track the segments that are created so that each may be resorted, as described below.

Step 1102 looks at the segments to determine if any exceed the threshold. Initially, as represented in FIG. 5, there is only one segment of length twenty-six, which exceeds the threshold value of ten, and thus step 1102 branches to step 1104. At step 1104, the split point of the segment, herein the center node, is selected. Note that the center node is simply the total number in the segment divided by two, rounding up any remainder. Thus, since the segment is twenty-six nodes in length, the thirteenth node, the "m" node, is selected. Also shown in step 1104, the preceding node ("l") is flagged as a soft terminal node.

At step 1106, the "m" node is moved to the start of the segment, and it is converted to a skip node by flagging its skip bit and by adding a skip pointer thereto. The skip pointer points to its original position, the jump node, which at present is the "n" node. Note that when the selected node is moved, the other nodes shift accordingly so that there is no space between any nodes, e.g., the "n" node now immediately follows the "l" node. At this time, the state $80_2$ is shown by FIG. 6. Step 1108 is then executed to increment the number of segments, and the enumeration process recursively loops back to step 1102 to split any other segment that exceeds the threshold value.

Thus, in the present example, two segments are present, each of which exceed the threshold. Accordingly, step 1102 detects that the first segment is too large, and step 1104 is executed. Step 1104 selects the "f" node as the center node. Note that the "m" skip node is not counted for purposes of segment length nor for selecting the center node. The "e" node is marked as a soft terminal node, and the "f" node moved to the start of the segment (after the "m" skip node, which is essentially not treated as part of the segment). The "f" node skip pointer is set to point to its former position as the jump position, presently the "g" node. Step 1108 then increments the segment counter.

The next segment detected at step 1102 as exceeding the threshold is the segment extending from the "n" node to the "z" node. Steps 1104–1108 similarly select the "t" node as the center node and move it to the start of this segment as the skip node. The "s" node is flagged as a soft terminal node, while the "u" node is presently the jump node for the "t" skip node. The number of segments is then incremented. At this time, the state $80_3$ may be represented as shown in FIG. 7.

The next time step 1102 is executed, however, all segments have been split such that none exceed the threshold value in terms of the number of nodes therein. Thus, step 1102 branches to step 1110 where the first segment is selected, not counting any skip nodes, i.e., the segment from the "a" node to the "e" node is selected. Although not necessary to the invention, for purposes of optimizing the search speed, step 1112 sorts this node according to lexical frequency, most frequent character first, least frequent last. Using the segment counter, (e.g., by decrementing it), step 1114 and 1116 repeat the process until all segments have been sorted in this manner. Note that the skip nodes do not move in the sorting operation, nor does the character represented thereby change. Further, note that the positions of the jump nodes and the terminal/soft terminal nodes do not change, however the nodes in those positions may change as a result of the sorting.

Figure 12:
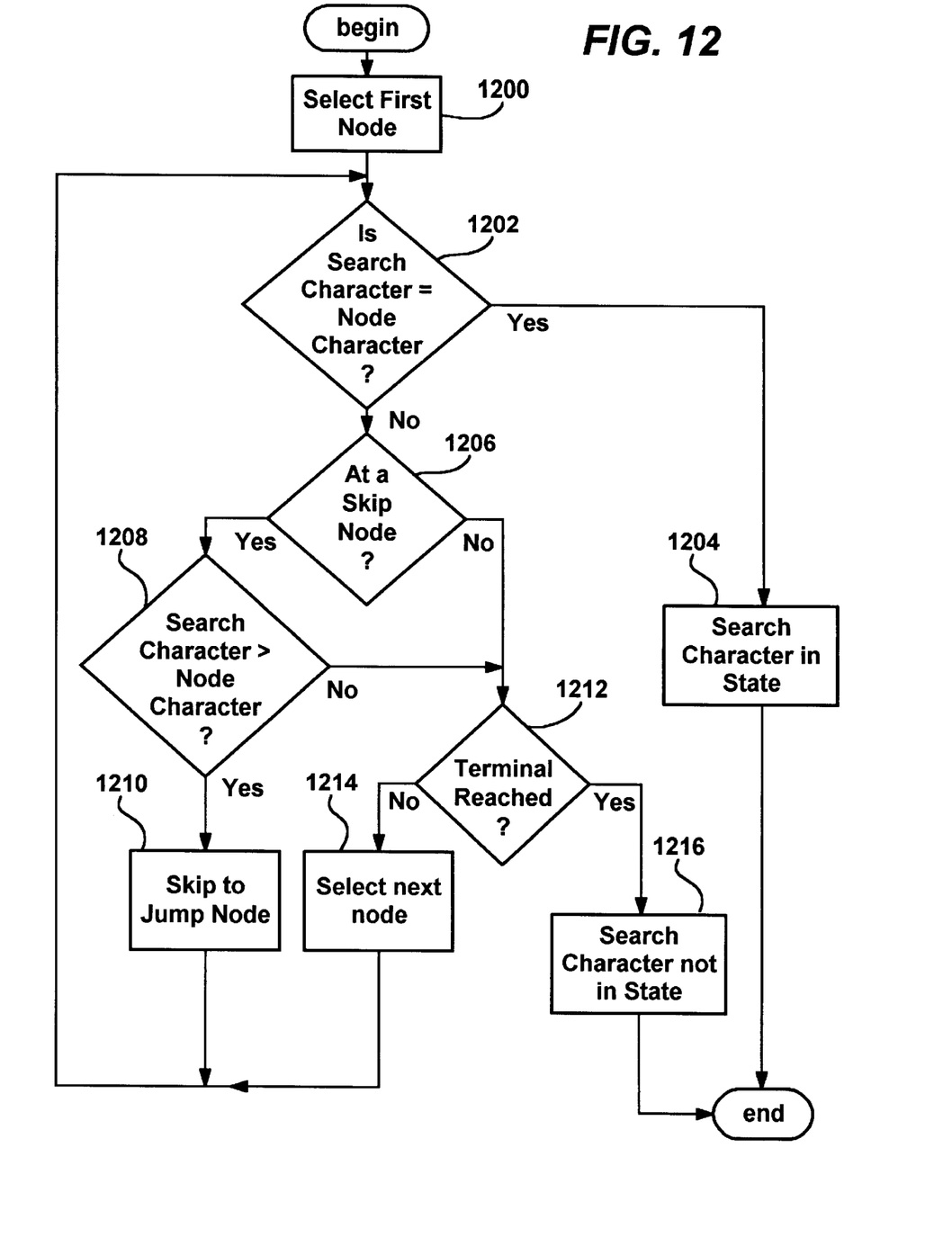
FIG. 12 is a flow diagram generally representing the steps taken to search a state that has been enumerated for improved searching thereof in accordance with one aspect of the present invention.

FIG. 12 exemplifies how a search algorithm that is aware of the skip encoding may utilize the improved enumerated trie of the present invention. Consider a search for the word "patent," wherein the state of FIG. 8 is the top-level state, i.e., the first node to be searched for is the "p" node. At step 1200, the first node of this top level state, the "m" node, is selected. At step 1202, a comparison is made to determine if the "mp" search character is that represented by the "m" node. If the two were the same, the search of this state would be over, and step 1202 would branch to step 1204 since the search character was in the state, and the next state pointed to by this node could be searched with a further character in the word (e.g., "a") as needed. However, in the present example, the characters are not the same at step 1202, and thus step 1202 continues to step 1206.

At step 1206, the search process looks at the skip flag of the "m" node to determine if it is a skip node. As described above, the "m" node is a skip node, and thus step 1206 branches to step 1208. Step 1208 compares the search character with the skip node's character, and if the character is greater than the node's character, branches to step 1210. If the search character was not greater, step 1208 branches to step 1212, where a check of the node's terminal status is made. Either a regular or soft terminal would end the search. However, a skip node is ordinarily not also a terminal node, and thus step 1214 which selects the next node is ordinarily the executed if the search character is less than the skip node character. In the present example, the "p" node is greater than the "m" node, and thus step 1208 branches to step 1210 where the search process skips ahead to select the "t" node, and loops back to the comparison of step 1202 to check the search character against this new node.

Since "p" is not equal to "t" at step 1202, step 1206 is executed to test if the "t" node is a skip node. Since it is, step 1208 is next executed, where it is determined that the search character "p" is not greater than the "t" character of the skip node. As a result, step 1208 branches to step 1212, where the "t" node is determined to not be a terminal node, and thus step 1212 branches to step 1214. Step 1214 selects (linearly) the next node in the state, the "s" node, as the new node to evaluate against the search character at step 1202.

As understood from the above description of these steps, step 1202 determines the characters are not the same, while steps 1206 and 1208 determine that the "s" node is neither a skip node nor a terminal node, respectively. Thus, the "p" node is selected as the next node at step 1214, and the search process returns to step 1202.

This time, however, the "p" search character and the node's "p" are the same character. Step 1202 thus branches to step 1204 where the search character is now known to be valid in this state. At this time, the down pointer of the "p" node is typically used to find a next state, and the "a" character in the word "patent" becomes the search character to use in this next state. Note that this next state may or may not be skip encoded. However, note that the search process of FIG. 12 operates as a normal linear search when no skip nodes or soft terminal nodes are present in a state. The only extra cost with respect to a straight linear search algorithm is essentially the extra test at step 1206, however the benefits of rapidly finding a matching node in a large skip-encoded state typically far outweigh the costs of this extra step, even when searching very large words. For example, to find a "w" in a straight linear search of an alphabetically-ordered a–z state requires that twenty-three nodes be visited, or eighteen nodes in an a–z state ordered by lexical frequency. Each visit requires node decompression. With skip encoding, the "w" is the fourth node visited. Indeed, in a state that is skip-encoded as shown in FIGS. 8 and 9, the maximum number of nodes that may be visited by the search process of FIG. 12 is eight.

Note that the present invention as described above takes advantage of alphabetic ordering, e.g., any one of the letters "n–z" is greater than "m," so if "m" is a skip node, the search skips to the right for "n–z." This is possible because ASCII and the like order their characters in this way, and when searching for an ASCII character, greater than or less than has a built-in meaning. However, it is alternatively feasible to use another ordering system such as lexical frequency. For example, in lexical frequency, "s" is less than "c" which in turn is less than "p" and so on. As long as some mapping (e.g., between lexical frequency and ASCII) is maintained with a trie dictionary, so that greater than and less than have a meaning for a given input, an alternative ordering system will work.

Figure 13:
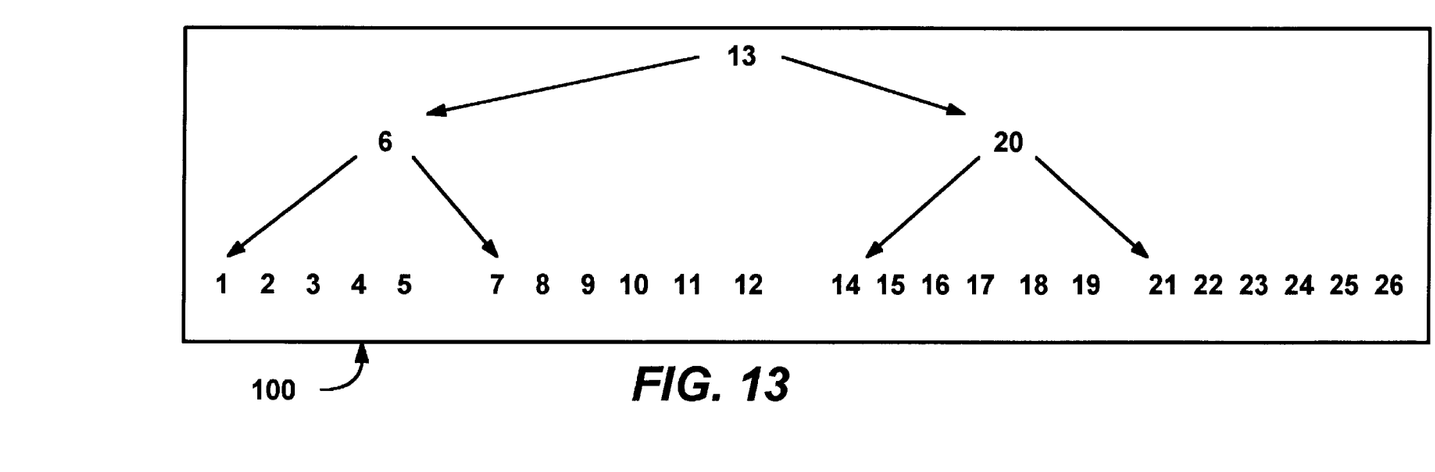
FIG. 13 is a representation of the nodes in a state and relationships therebetween in accordance with one aspect of the present invention.
Figure 14:
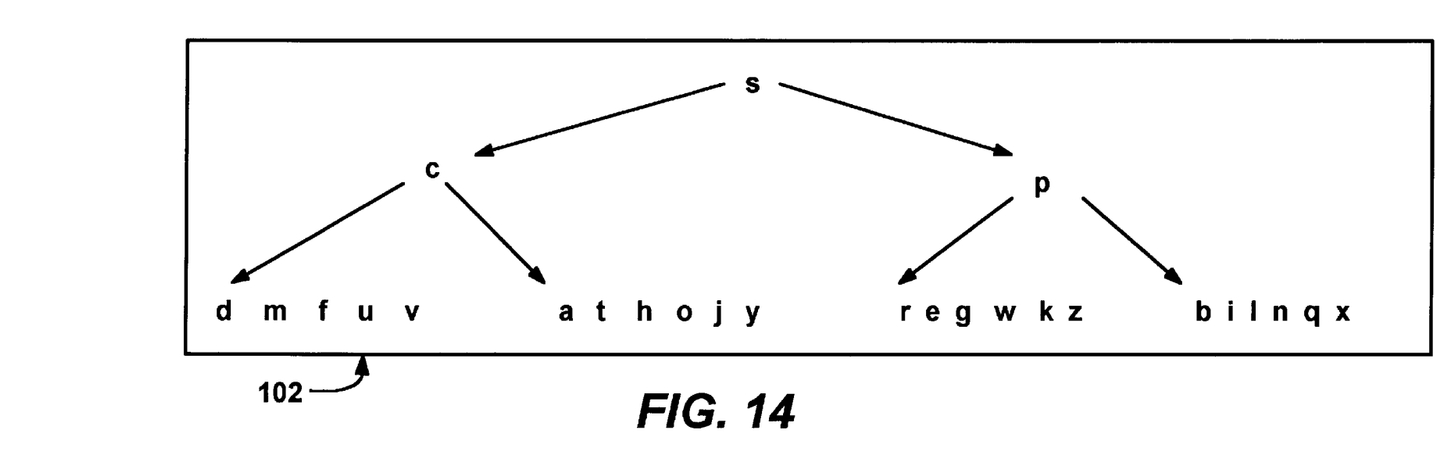
FIG. 14 is a representation of the nodes in a state arranged according to lexical frequency and enumerated in accordance with one aspect of the present invention.

By way of example, using numbers, FIG. 13 shows how twenty-six characters in a state 100 may be split. Excluding any offset, if "a" equals "1" up to "z" equals "26," then the state 100 shown in FIG. 13 is the same as the state 80$_4$ shown in FIG. 9 However, consider mapping "s" to "13," "c" to "6," "p" to "20," "d" to "1" and so on as shown in the state 102 of FIG. 14, and maintaining the map in conjunction with the trie. Then, during a search of this state 102, instead of comparing the search character's letter to the node's letter when a skip node is reached, the mapped number values are looked up and used in the comparison (e.g., at step 1208) to determine whether to skip to the jump node or move one node to the right. As can be readily appreciated, if the letter is somewhere within the state 102, the proper node ultimately will be visited, however the more frequent the letter is lexically, the less visits will be required to find that node. For example, "s" requires one visit, "c" or "p" two visits, "d," "a," "r" or "b" three visits, and so on. Some cost in size (map storage) and speed (map lookup whenever a skip node is reached) will be incurred, however the average search time may drop significantly from having to visit less nodes for the most frequent characters, particularly in certain languages. Note that since the nodes in the state are still stored linearly, existing linear operations will still work correctly.

Moreover, the present invention does not have to split up the states evenly in the center, but may split a state anywhere. For example, one or more splits may be based on frequency of usage or the cost of traversal, such as splitting so that each segment gets visited approximately the same amount of times for a random sample of words. In other words, if there were as many words beginning with "a–k" as there were beginning with "m–z," then split at the "l" node. Also, some words are used far more than others, and this criteria may be considered determining how to split the state.

Figure 15:
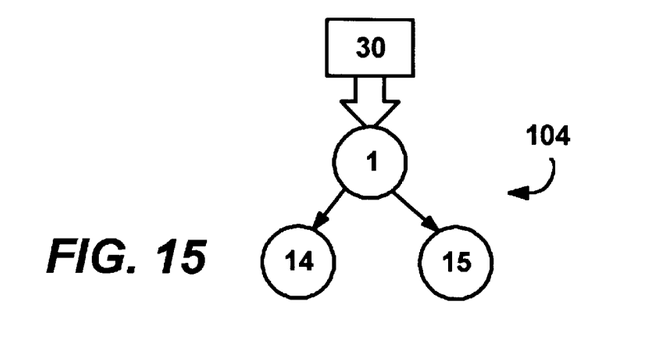
FIGS. 15–17 generally show alternative ways in which exemplary nodes of a state may be enumerated in accordance with aspects of the present invention for improved searching of that state.
Figure 16:
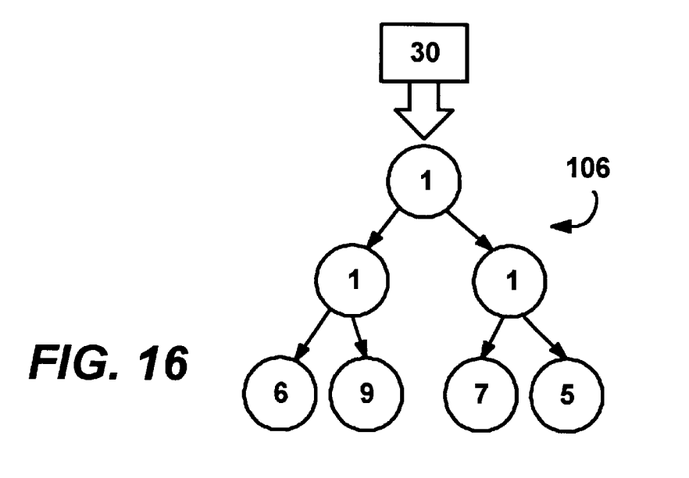
Figure 17:
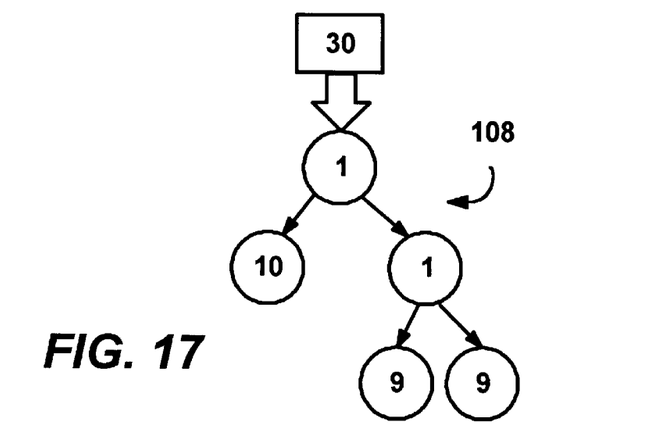

FIGS. 15–17 show some examples of how states of thirty nodes may be split using the method and system of the present invention. In FIG. 15, the nodes of a state 104 are split once (by one skip node) into two segments, as evenly as possible, and in FIG. 16, the nodes of a state 106 are split twice (by two skip nodes) into four segments, in which the nodes are not distributed evenly among the segments. In FIG. 17, the nodes of a state 108 are split into three segments, via two skip nodes. As can be readily appreciated, many permutations are possible, even with this small number of nodes. What works well to speed a search for one language (such as English with relatively few characters) may not work with another language (such as one with thousands of characters), however straightforward testing can find the better ways of splitting the states to decrease searching times. Similarly, the words in the trie will likely influence the splits, i.e., a medical dictionary is likely to be somewhat different than a general purpose word processing dictionary.

Moreover, it is feasible to use the skip encoding method and system of the present invention with skips that are not binary in nature. For example, a skip node may have pointers to first and second jump nodes. Then, when searching, a search character less than the skip node moves the search right to the next node, a search character that is more than ten (or some other predetermined value) skips the search to the second jump node, while any other search character skips the search to the first jump node. Alternatively, the skip node may store the value (e.g., ten) or the character value (e.g., "s") to use in the second comparison. Note that the node to the right and the two jump nodes may themselves be skip nodes, binary or otherwise.

Lastly, it should be noted that the present invention does not require that the skip node be moved to the beginning of the state, nor that the skip node point to its previous position as the jump node. For example, the "m" node of FIG. 5 could be moved forward to after the "a" node and still provide benefits, i.e., if the search character was not an "a," the "m" node would be reached after the "a" and the skip node would otherwise operate as before. While seemingly less efficient, the skip pointers may be placed, for example, after characters of very high lexical frequency at the start of a state, possibly resulting in increased search speeds. Similarly, instead of pointing to the "n" node in FIG. 6, the "m" node could point to any further node in the state having a character less than its relative value, such as the "g" node, and a search would still work, for example, as long as the search algorithm ignored soft terminal nodes.

As can be seen from the foregoing detailed description, there is provided an improved trie enumeration method, system and data structure, along with a method of searching same. Significant increases in search speeds are obtainable with only a slight increase in the size of the data structure.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer-implemented method, comprising, selecting from computer storage a selected state from among a plurality of states capable of being arranged into a trie, selecting a node within the selected state as a selected node, converting the selected node to a first skip node by moving it forward in the selected state relative to its original position therein, and setting a pointer in the first skip node to point to a first further node in the selected state.

2. The method of claim 1 wherein the selected node is moved to the beginning of the selected state.

3. The method of claim 1 wherein the pointer in the first skip node is set to point to a position in the selected state that is a previous position of the first skip node.

4. The method of claim 1 further comprising selecting a node in the state as a soft terminal node.

5. The method of claim 4 wherein the soft terminal node is the node immediately before the further node.

6. The method of claim 4 further comprising setting a flag in the soft terminal node to indicate the soft terminal status thereof.

7. The method of claim 1 further comprising, converting another node in the selected state to a second skip node by moving it forward in the selected state relative to its current position therein, and setting a pointer in the second skip node to point to a second further node in the selected state.

8. The method of claim 7 wherein the second further node is before the first further node pointed to by the first skip node.

9. The method of claim 7 wherein the second further node is after the first further node pointed to by the first skip node.

10. The method of claim 7 wherein the second skip node is moved to immediately after the first skip node.

11. The method of claim 1 further comprising sorting at least some of the nodes in the state by lexical frequency.

12. The method of claim 1 further comprising sorting nodes in the selected state other than the first skip node by lexical frequency.

13. The method of claim 1 further comprising, selecting a node in the selected state as a soft terminal node, wherein the soft terminal node is after the first skip node in the selected state, the soft terminal node delineating first and second segments of nodes relative to the position thereof, sorting at least some of the nodes in the first segment by lexical frequency, and sorting at least some of the nodes in the second segment by lexical frequency.

14. The method of claim 1 further comprising, selecting a node in the selected state as a soft terminal node, wherein the soft terminal node is after the first skip node in the selected state, the soft terminal node delineating first and second segments of nodes relative to the position thereof, comparing a number of nodes in the first segment against a threshold value, and if the number of nodes in the first segment exceeds the threshold value, converting another node in the first segment to a second skip node by moving it forward in the first segment relative to its current position therein, and setting a pointer in the second skip node to point to another node in the first segment that is positioned after the second skip node.

15. The method of claim 14 further comprising selecting a node in the first segment as a second soft terminal node.

16. The method of claim 14 further comprising splitting each segment in the state that is greater than the threshold value into a plurality of segments until a number of nodes in each segment in the selected state does not exceed the threshold value.

17. The method of claim 1 further comprising searching the selected state for a node therein having a particular identifier associated therewith.

18. The method of claim 17 wherein searching the selected state comprises, selecting a beginning node in the selected state, and comparing an identifier associated with the beginning node to determine if the identifier associated with the beginning node corresponds to the particular identifier.

19. The method of claim 18 wherein if comparing determines that the identifier associated with the beginning node does not correspond to the particular identifier, performing steps including, determining if the beginning node is a skip node, and if the beginning node is not a skip node, selecting a node immediately thereafter, and if the beginning node is a skip node, comparing a relative value of the particular identifier with a relative value of the identifier of the beginning node.

20. The method of claim 19 wherein if comparing a relative value determines that the particular identifier is not greater than the identifier of the beginning node, performing the step of selecting a node immediately thereafter as a selected node, and if comparing a relative value determines that the particular identifier is greater than the identifier of the beginning node, performing the step of determining a skip pointer, and selecting a node pointed to by the skip pointer as the selected node.

21. The method of claim 20 further comprising comparing an identifier associated with the selected node to determine if the identifier associated with the selected node corresponds to the particular identifier.

22. A computer-readable medium having stored thereon a data structure that provides improved searching efficiency, comprising:
(a) a plurality of states, each of the states having at least one node therein;
(b) at least one of the states of the plurality of states encoded as a skip encoded state, each skip encoded state having at least three nodes therein, each of the nodes in each skip encoded state logically stored in a linear relationship; and
(c) each skip encoded state including at least one skip node, the skip node logically before a jump node in the state, there being at least one other node between the skip node and the jump node, the skip node including a pointer to the jump node.

23. The computer-readable medium having stored thereon the data structure of claim 22, wherein each node includes an identifier corresponding to a character.

24. The computer-readable medium having stored thereon the data structure of claim 22, wherein each node includes a skip flag having a value indicative of whether that node is a skip node.

25. The computer-readable medium having stored thereon the data structure of claim 22, wherein a node before the jump node in the skip encoded state is a soft terminal node.

26. The computer-readable medium having stored thereon the data structure of claim 22, wherein each node includes a soft terminal flag having a value indicative of whether that node is a soft terminal node.

27. The computer-readable medium having stored thereon the data structure of claim 26, wherein each node further includes a terminal flag having a value indicative of whether that node is a terminal node.

28. The computer-readable medium having stored thereon the data structure of claim 22, wherein the data structure is accessed by executable searching software, and wherein the executable searching software is configured to skip from the skip node to the jump node via the pointer without reaching the at least one other node between the skip node and the jump node during a search operation.

29. A method of searching a state of nodes in a trie for a particular identifier, comprising the steps of:
(1) selecting a node in the state as a selected node;
(2) comparing the particular identifier to an identifier of the selected node; and
(3) if the particular identifier corresponds to the identifier of the selected node, completing the search of that state; and
(4) if the particular identifier does not correspond to the identifier of the selected node, determining if the selected node is a skip node;
(a) if the selected node is not a skip node, selecting another node in the state as the selected node; and
(b) if the selected node is a skip node, comparing the relative values of the particular identifier and the identifier of the selected node; and
(i) if the relative values indicate that the particular identifier is greater than the identifier of the selected node, determining a jump node pointed to by the skip node and selecting the jump node as the selected node; and
(ii) if the relative values indicate that the particular identifier is not greater than the identifier of the selected node, selecting another node in the state as the selected node.

30. The method of claim 29 further comprising the steps of repeating steps (2)–(4) until the particular identifier corresponds to the identifier of the selected node at step (3), or detecting a search end point.

31. The method of claim 30 wherein the search end point is a terminal node.

32. The method of claim 30 wherein the search end point is a soft terminal node.

33. The method of claim 30 wherein the step of detecting a search end point comprises the step of evaluating at least one flag in the selected node.

34. The method of claim 29 wherein if the selected node is not a skip node at step (4)(*a*), the selected node is the next node linearly in the state.

35. The method of claim 29 wherein if the selected node is not a skip node at step (4)(*b*)(ii), the selected node is the next node linearly in the state.

36. The method of claim 29 wherein the particular identifier and the identifier of the node are each associated with a character.

* * * * *